United States Patent
Takeichi et al.

(10) Patent No.: US 10,865,878 B2
(45) Date of Patent: Dec. 15, 2020

(54) CONTROL SYSTEM FOR VEHICLE

(71) Applicant: TOYOTA JIDOSHA KABUSHIKI KAISHA, Toyota (JP)

(72) Inventors: Akira Takeichi, Susono (JP); Ayumu Sagawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 80 days.

(21) Appl. No.: 16/205,335

(22) Filed: Nov. 30, 2018

(65) Prior Publication Data
US 2019/0162298 A1 May 30, 2019

(30) Foreign Application Priority Data

Nov. 30, 2017 (JP) ................ 2017-230974

(51) Int. Cl.
*F16H 61/02* (2006.01)
*F16H 59/18* (2006.01)
*F16H 59/44* (2006.01)

(52) U.S. Cl.
CPC ......... *F16H 61/0213* (2013.01); *F16H 59/18* (2013.01); *F16H 59/44* (2013.01); *F16H 2059/183* (2013.01); *F16H 2061/022* (2013.01); *F16H 2306/14* (2013.01)

(58) Field of Classification Search
CPC .... F16H 59/18; F16H 59/44; F16H 2059/183; F16H 2059/446; F16H 61/0213; F16H 2061/022; F16H 2306/14
See application file for complete search history.

(56) References Cited

U.S. PATENT DOCUMENTS

| | | | |
|---|---|---|---|
| 4,576,065 A * | 3/1986 | Speranza | B60W 10/11 701/55 |
| 5,624,351 A * | 4/1997 | Fujita | F16H 61/0213 477/133 |
| 5,642,283 A * | 6/1997 | Schulz | F16H 61/061 192/3.33 |
| 6,066,071 A * | 5/2000 | Janecke | F16H 61/702 477/78 |
| 7,048,673 B2 * | 5/2006 | Shim | F16H 61/0437 477/143 |
| 8,936,532 B2 * | 1/2015 | Razaznejad | F16H 61/0213 477/175 |
| 9,217,502 B2 * | 12/2015 | Wierzbowski | F16H 59/02 |

(Continued)

FOREIGN PATENT DOCUMENTS

CN    102 713 364 A    10/2012
EP    2 065 281 A1     6/2009

(Continued)

*Primary Examiner* — David R Morris
(74) *Attorney, Agent, or Firm* — Oliff PLC

(57) ABSTRACT

A vehicle control system to improve acceleration response and shift feel by executing a power-on downshifting in a suitable manner. An evaluation of a skip shifting and an evaluation of a stepwise shifting are compared to each other when executing the downshifting, based on an evaluation index calculated in advance in accordance with an operating condition of an accelerator. The downshifting operation to be executed is selected from the stepwise shifting and the skip shifting whose evaluation is higher than the other one.

7 Claims, 7 Drawing Sheets

(56) References Cited

U.S. PATENT DOCUMENTS

2004/0116251 A1* 6/2004 Shim .................. F16H 61/0437
                                                477/143
2013/0172147 A1* 7/2013 Razaznejad ........... B60W 10/06
                                                477/77
2014/0196559 A1* 7/2014 Wierzbowski .......... F16H 59/02
                                                74/473.11

FOREIGN PATENT DOCUMENTS

| | | | |
|---|---|---|---|
| JP | H05-231533 | A | 9/1993 |
| JP | 2006-038050 | A | 2/2006 |
| JP | 2009133432 | A | 6/2009 |
| JP | 2014-126112 | A | 7/2014 |
| JP | 2014-190498 | A | 10/2014 |
| WO | 2011/076225 | A1 | 6/2011 |

* cited by examiner

High Operating Speed

| Skip Shifting | T2 | a | b | c | d |
|---|---|---|---|---|---|
| | | 3.2 | 3.1 | 3 | 2.9 |

| Stepwise Shifting | T2 | a | b | c | d |
|---|---|---|---|---|---|
| | | 1.6 | 1.4 | 1.2 | 1 |
| | T3 | a | b | c | d |
| | | 1.4 | 1.2 | 1 | 0.8 |

(a>b>c>d)

Low Operating Speed

| Skip Shifting | T2 | a | b | c | d |
|---|---|---|---|---|---|
| | | 2 | 1.8 | 1.6 | 1.4 |

| Stepwise Shifting | T2 | a | b | c | d |
|---|---|---|---|---|---|
| | | 2 | 1.8 | 1.6 | 1.4 |
| | T3 | a | b | c | d |
| | | 1.8 | 1.6 | 1.4 | 1.2 |

(a>b>c>d)

CONTROL SYSTEM FOR VEHICLE

CROSS REFERENCE TO RELATED APPLICATIONS

The present application claims the benefit of priority to Japanese Patent Application No. 2017-230974 filed on Nov. 30, 2017 with the Japanese Patent Office, the entire contents of which are incorporated herein by reference in its entirety.

BACKGROUND

Field of the Disclosure

An embodiment of the disclosure relates to the art of a control system for a vehicle having an automatic transmission, and more particularly, to a control system for controlling a shifting operation of the automatic transmission.

Discussion of the Related Art

JP-A-2014-190498 describes a control device for an automatic transmission configured to prevent execution of an unnecessary kickdown shift while improving a response of kickdown shift. According to the teachings of JP-A-2014-190498, a variable speed estimation value is calculated based on a synthesized vectorized value of change amounts of an accelerator opening and a vehicle speed. When the calculated variable speed estimation value exceeds a downshift line and the accelerator opening exceeds an up-shift line, a downshift is caused while setting a target gear stage to a stage at least one stage lower than the current gear stage. If the accelerator opening exceeds the down-shift line before the elapse of a predetermined period of time, the downshifting to the target stage is continued. By contrast, if the accelerator opening does not exceed the down-shift line before the elapse of a predetermined period of time, the downshifting is discontinued.

JP-A-2006-38050 describes a shifting control device for an automatic transmission which can be operated in an automatic mode and a manual mode. According to the teachings of JP-A-2006-38050, in the manual mode, the shifting control device predicts existence of a second downshifting input on the basis of an operating condition when a first downshifting input is inputted. If the second downshifting input is predicted, a predetermined delay time is set. If the second downshifting is inputted within the delay time, a skip downshifting is caused to shift the gear stage to the gear stage at least two stages lower than the current stage.

JP-A-2014426112 describes a method for controlling an automatic transmission of vehicle configured to reduce a time lag before downshifting and to ensure preferable shift feeling, in the event of skip shifting. According to the teachings of JP-A-2014-126112, when an accelerator pedal is depressed and a gear stage is shifted to a stage at least two stages lower than a current stage, an exceedance of a vehicle speed over an upshift line to a stage one stage higher than the current stage before the completion of such skip downshifting is predicted. If the vehicle speed is not expected to exceed the upshift line, the skip downshifting is executed. Otherwise, if the vehicle speed is expected to exceed the upshift line, the gear stage is shifted stepwise to the target stage in order. Specifically, if a difference between the vehicle speed when the accelerator pedal is depressed and the vehicle speed at the upshift line is less than a predetermined value, the skip downshifting is executed. Otherwise, if the above-mentioned speed difference is greater than the predetermined value, the gear stage is shifted stepwise to the target stage in order.

JP-A-H5-231533 describes a control device for an automatic transmission configured to prevent multiple executions of downshifting in a short time, in the event of a power-on downshifting. According to the teachings of JP-A-H5-231533, the control device is configured to determine a required shifting operation according to an operating state of the vehicle. If the power-on downshifting is required, execution of the downshifting is suspended, and a gear stage is shifted to a target stage after the elapse of a predetermined delay time.

It is possible to shorten the required time for shifting the gear stage to the target gear stage to improve a shifting response by executing the skip shifting. However, a shift feel may not always be improved by the skip shifting in every situation. For example, shift feel and acceleration response may be improved by shifting the gear stage stepwise in order rather than the skip shifting, even if the target stage is two or more stages lower or higher than the current stage. By contrast, even if the target stage is not set to the stage two or more stages lower or higher than the current stage, shift feel and acceleration response may be improved by executing the skip shifting.

SUMMARY

Aspects of embodiments of the present disclosure have been conceived noting the foregoing technical problems, and it is therefore an object of the present disclosure to provide a vehicle control system configured to improve acceleration response and shift feel by executing a downshifting in a suitable manner in response to an acceleration demand.

The control system according to the embodiment of the present disclosure is applied to a vehicle having a prime mover, drive wheels, and a transmission. In the transmission, at least three gear stages may be established to transmit torque between the prime mover and the drive wheels. The control system is provided with a controller that controls a shifting operation of the transmission. Specifically, the controller is configured to: set a target stage of the shifting operation based on an accelerator opening and a vehicle speed increased by an accelerating operation of a driver; execute a downshifting from a current stage to the target stage set to a gear stage lower than the current stage, in response to the accelerating operation; compare an evaluation of a skip shifting to shift the gear stage directly to the target stage that is set to at least two stages lower than the current gear stage, to an evaluation of a stepwise shifting to shift the gear stage stepwise to the target stage, when executing the downshifting, based on an evaluation index calculated in advance in accordance with an operating condition of an accelerator; and select the downshifting operation to be executed from the stepwise shifting and the skip shifting whose evaluation is higher than the other one.

In a non-limiting embodiment, the controller may be further configured to: calculate an operating speed of the accelerator during a period from a point at which the accelerating operation has been started to a point at which a commencement of the downshifting is determined; and select the downshifting operation to be executed from the stepwise shifting and the skip shifting based on the evaluation index and the operating speed of the accelerator.

In a non-limiting embodiment, if the skip downshifting is selected based on the evaluation index, the skip shifting may be executed if the accelerator opening is increased continuously by the accelerating operation, and the stepwise shifting may be executed if the accelerator opening is not increased continuously by the accelerating operation.

In a non-limiting embodiment, if the skip shifting is selected, and the accelerator opening is increased continuously by the accelerating operation, the controller may calculate a predicted value of the accelerator opening at the termination of the accelerating operation, and may determine whether to execute the skip shifting based on the predicted value of the accelerator opening.

In a non-limiting embodiment, the controller may comprise a shift map determining regions for selecting the gear stage of the transmission. The controller may be further configured to execute the skip shifting if the predicted value of the accelerator opening in the shift map falls within a predetermined range from a skip shift line defining one stage lower region than a current region and two stages lower region than the current region, or if the predicted value of the accelerator opening in the shift map falls within the two stages lower region than the current region.

In a non-limiting embodiment, the controller may be further configured to execute the stepwise shifting after the lapse of a predetermined period, if the predicted value of the accelerator opening in the shift map falls out of the predetermined range from the skip shift line.

In a non-limiting embodiment, the controller may be further configured to calculate the predicted value of the accelerator opening based at least on an operating amount of the accelerator, a change amount of the operating amount of the accelerator, and a tendency of a change in the operating amount of the accelerator.

Thus, according to the embodiment of the present disclosure, when executing the power-on downshifting to the target stage set to at least two stages lower than the current stage in response to the accelerating operation, the downshifting operation to be executed is selected from the skip shifting to shift the gear stage directly to the target stage and the stepwise shifting to shift the gear stage stepwise to the target stage, based on the evaluation index of acceleration feel or acceleration response. To this end, the evaluation index is calculated in advance in accordance with an operating condition of the accelerator, for each case of executing the skip downshifting and the stepwise downshifting. According to the embodiment of the present disclosure, therefore, the downshifting to be executed may be selected from the skip downshifting and the stepwise downshifting in such a manner as to improve the acceleration feel or the acceleration response.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
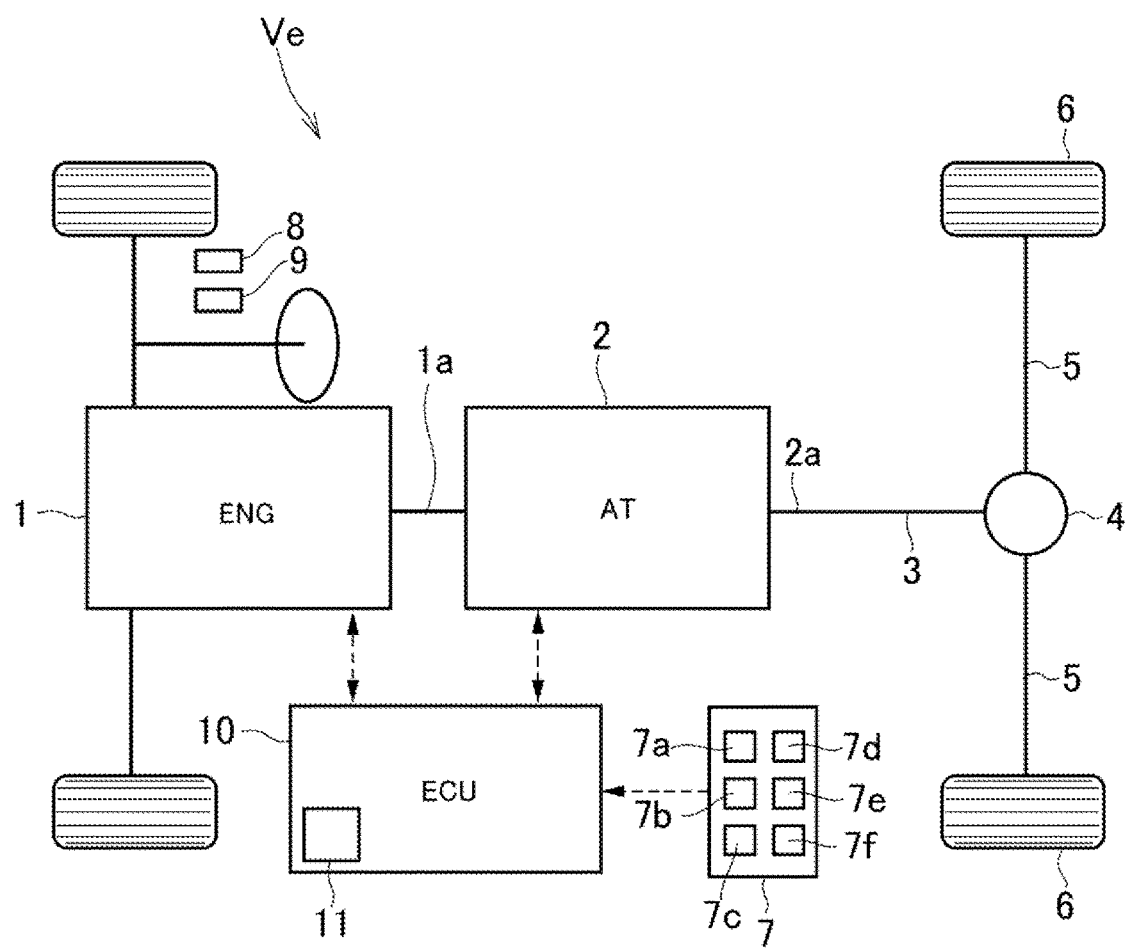
FIG. 1 is a schematic illustration showing one example of a structure of the vehicle to which the vehicle control system according to the embodiment of the present disclosure is applied.

Preferred embodiments of the present disclosure will now be explained with reference to the accompanying drawings. Turning now to FIG. 1, there is shown a structure of a vehicle Ve to which the vehicle control system according to the embodiment of the present disclosure is applied. The vehicle Ve shown in FIG. 1 is a rear-drive layout vehicle in which a power generated by the prime mover is delivered to a pair of rear wheels as drive wheels 6. The vehicle Ve comprises an engine (referred to as "ENG" in FIG. 1) 1 as a prime mover, and an automatic transmission (as will be simply called the "transmission" hereinafter) 2 is connected to an output side of the engine 1. The transmission 2 is connected to a differential gear unit 4 through a propeller shaft 3, and each of the drive wheels 6 is individually connected to the differential gear unit 4 through a driveshaft 5. Nonetheless, the vehicle control system may also be applied to a front-drive layout vehicle in which an output power of the engine is delivered to a pair of front wheels, and a four-wheel-drive layout vehicle in which an output power of the engine is distributed to each pair of front wheels and rear wheels.

For example, an internal combustion engine such as a gasoline engine and a diesel engine may be adopted as the engine 1. An output power of the engine 1 may be adjusted electrically, and the engine 1 may be started and stopped electrically according to need. For example, given that the gasoline engine is used as the engine 1, an opening degree of a throttle valve, an amount of fuel supply or fuel injection, a commencement and a termination of ignition, an ignition timing etc. may be controlled electrically. Otherwise, given that the diesel engine is used as the engine 1, an amount of fuel injection, an injection timing, an opening degree of a throttle valve of an Exhaust Gas Recirculation (EGR) system etc. may be controlled electrically.

The transmission 2 transmits a torque between the engine 1 and the drive wheels 6 while changing an input speed from an output shaft (i.e., a crankshaft) 1a of the engine 1. For example, a conventional automatic transmission having a planetary gear unit, and a clutch and a brake manipulated to establish a gear stage (neither of which are shown) may be adopted as the transmission 2. Instead, a dual clutch transmission (DCT) having two pairs of gears and a clutch for establishing gear stages may also be adopted as the transmission 2. Thus, the transmission 2 is a geared transmission in which a gear stage may be selected from more than three stages.

The vehicle Ve is provided with a detector 7 for collecting data about the vehicle Ve. Specifically, the detector 7 comprises: an air flow meter 7a that detects a flow rate of air intake of the engine 1; an engine speed sensor 7b that detects a rotational speed of the output shaft 1a of the engine 1; an output speed sensor 7c that detects a rotational speed of an output shaft 2a of the transmission 2; the accelerator position sensor 7d that detects a depression (i.e., a position) and an operation speed of an accelerator pedal 8; a brake sensor (or a brake switch) 7e that detects a depression (or an operating amount) and an operation speed of a brake pedal 9; a wheel speed sensor 7f that detects rotational speeds of the drive wheels 6 as well as front wheels. The detector 7 is electrically connected to an after-mentioned controller 10 so that detection data based on a detection value obtained by the sensors is transmitted to the controller 10 in the form of electric signal.

The vehicle Ve is controlled by the controller 10 as an electronic control unit including a microcomputer. The controller 10 performs a calculation using the data transmitted form the detector 7, and data (including an after-mentioned shift map 11) and formulas and the like stored in advance. Calculation results are transmitted from the controller 10 to the engine 1, the transmission 2, and so on in the form of command signal. For example, the controller 10 controls a hydraulic control unit to execute a shifting operation of the transmission 2 thereby establishing a desired gear stage. Although only one controller 10 is depicted in FIG. 1, a plurality of controllers may be arranged in the vehicle Ve to control the specific devices individually.

In order to execute a shifting operation of the transmission 2, a shift map 11 defining gear stage regions is installed in a storage device (not shown) of the controller 10. The shift map 11 is configured such that the gear stage of the transmission 2 is shifted based on a vehicle speed and a position of the accelerator pedal 8 representing an accelerator opening. An example of the shift map is shown in FIG. 2.

Figure 2:
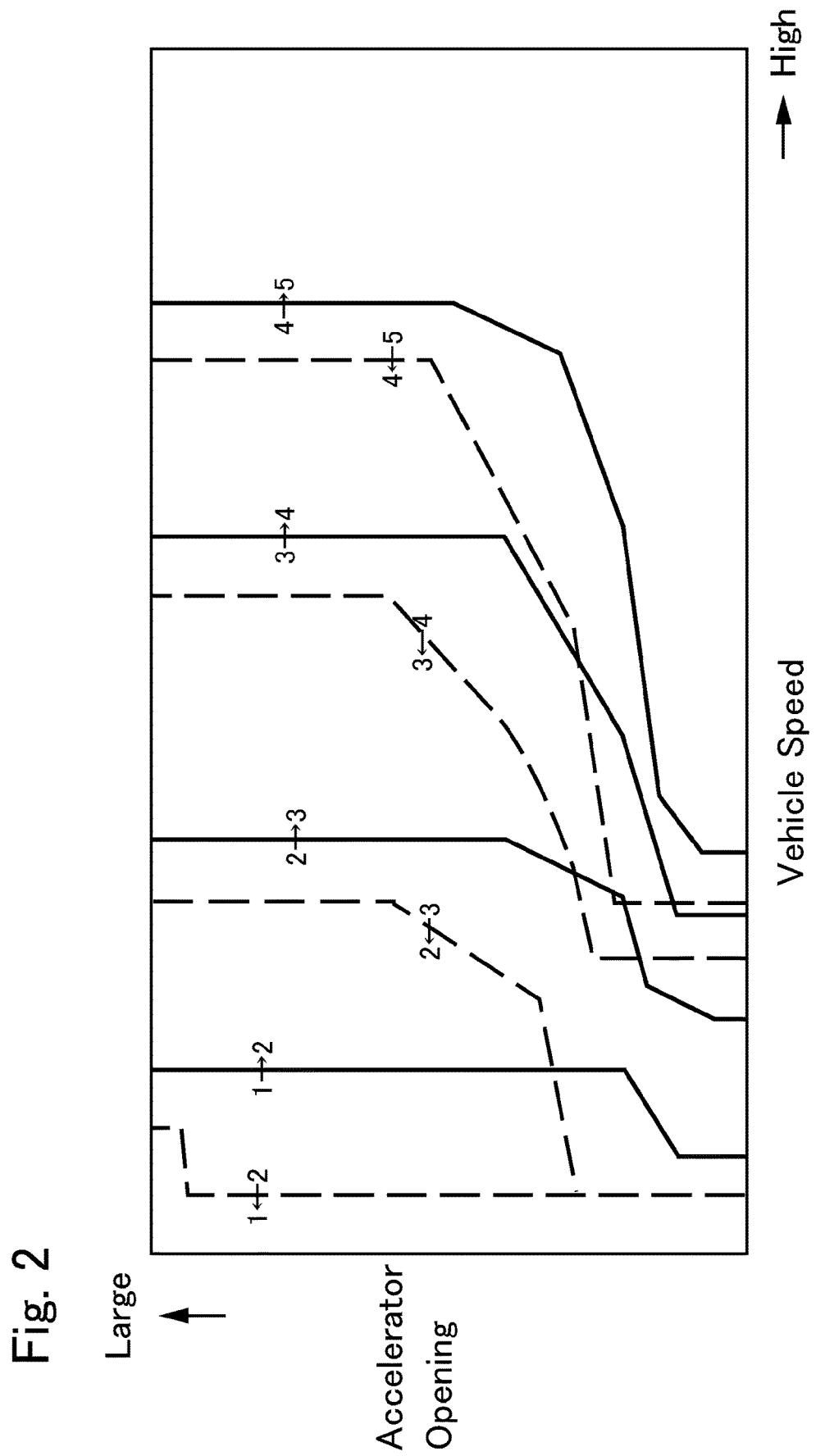
FIG. 2 is a shift map used to shift a gear stage of the automatic transmission.

In FIG. 2, the vertical axis represents the accelerator opening, and the horizontal axis represents a vehicle speed. Each solid curve in FIG. 2 is an upshift line. In FIG. 2, specifically, the upshift line 1→2 is a boundary between the first stage region and the second stage region, the upshift line 2→3 is a boundary between the second stage region and the third stage region, the upshift line 3→4 is a boundary between the third stage region and the fourth stage region, and the upshift line 4→5 is a boundary between the fourth stage region and the fifth stage region. That is, the gear stage of the transmission 2 is established based on a location of an operating point of the vehicle Ve determined based on the vehicle speed and the accelerator opening in the shift map 11 shown in FIG. 2. For example, an execution of an upshifting is determined when the vehicle speed is increased so that the operating point of the vehicle Ve is shifted across the upshift line from left to right in FIG. 2, or the accelerator opening is reduced so that the operating point is shifted across the upshift line downwardly in FIG. 2. Consequently, a target stage to be established by the transmission 2 is determined based on a current location of the operating point of the vehicle Ve in the shift map 11.

On the other hand, each dashed curve in FIG. 2 is a downshift line. In FIG. 2, specifically, the downshift line 4←5 is a boundary between the fifth stage region and the fourth stage region, the downshift line 3←4 is a boundary between the fourth stage region and the third stage region, the downshift line 2←3 is a boundary between the third stage region and the second stage region, and the downshift line 1←2 is a boundary between the second stage region and the first stage region. For example, an execution of downshifting is determined when the vehicle speed is reduced so that the operating point is changed across the downshift line from right to left in FIG. 2, or the accelerator opening is increased so that the operating point is shifted across the downshift line upwardly in FIG. 2. Consequently, the target stage to be established by the transmission 2 is determined based on a current location of the operating point of the vehicle Ve in the shift map 11. As can be seen from FIG. 2, in order to prevent an occurrence of hunting (i.e., a busy shift), a predetermined hysteresis area is maintained between each of the downshift line and each of the upshift line.

Alternatively, the operating point thus representing an operating condition of the vehicle Ve may also be determined based on a rotational speed of a predetermined rotary member instead of the vehicle speed, and other detection data representing the accelerator opening.

As described, the vehicle control system according to the embodiment of the present disclosure is configured to improve acceleration response and shift feel by executing a downshifting in a suitable manner, when a downshifting is required to accelerate the vehicle Ve. For this purpose, the controller 10 executes the routine shown in FIG. 3.

Figures 3, 4:
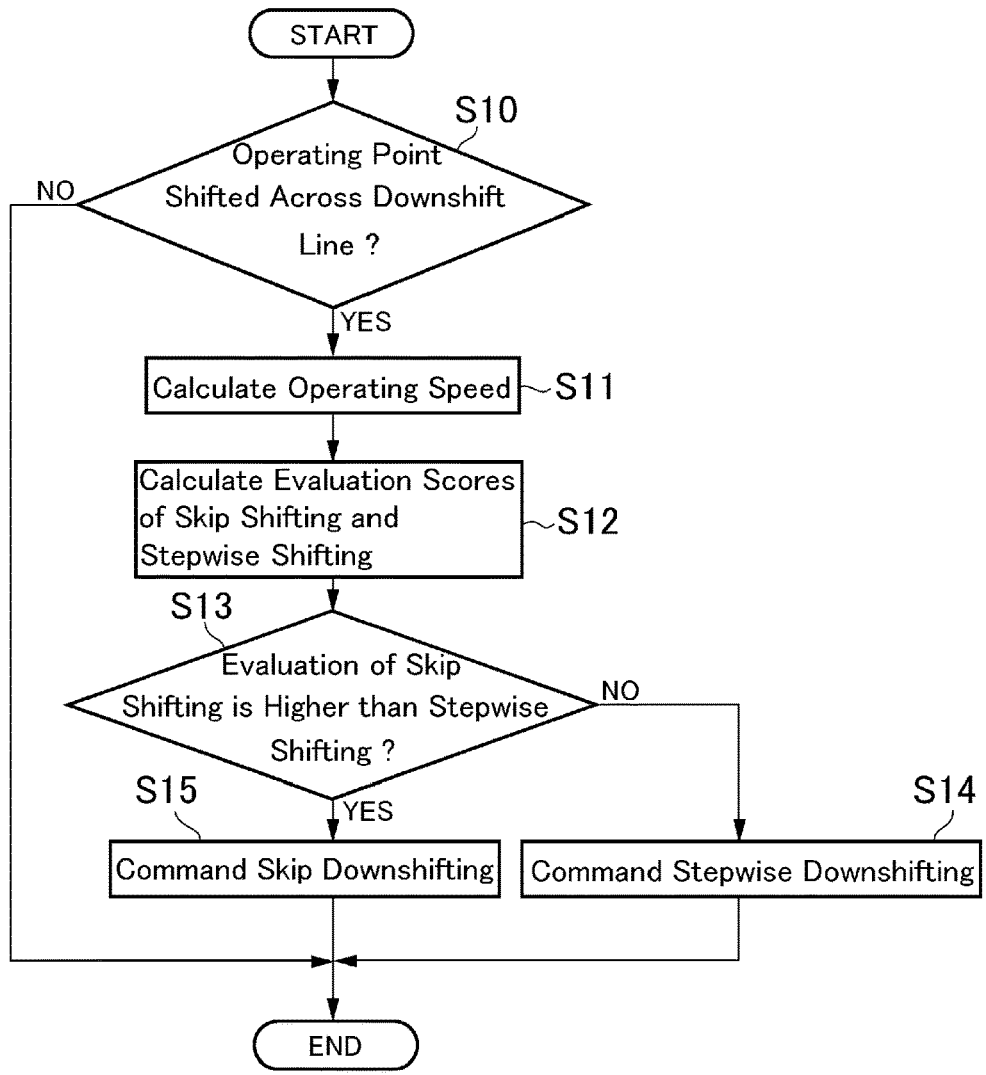
FIG. 3 is a flowchart showing one example of a routine executed by the vehicle control system according to the embodiment of the present disclosure.
FIG. 4 is a table showing evaluation scores of acceleration feel to be achieved by operating the accelerator at a high speed.

Specifically, the routine shown in FIG. 3 is executed when the accelerator pedal 8 is depressed so that a so-called "power-on downshifting" is executed to shift the gear stage of the transmission 2 to the lower stage. In the vehicle Ve, an opening degree of a throttle valve corresponding to the accelerator opening is increased with an increase in a depression of the accelerator pedal, and consequently an output power of the engine 1 is increased.

First of all, in order to determine an execution of an accelerating operation, it is determined at step S10 whether the operating point of the vehicle Ve is shifted across the downshift line. At step S10, specifically, it is determined whether the accelerator opening is increased so that the operating point is shifted to one stage lower region across the downshift line upwardly in the shift map 11. For example, in a case that the fifth stage is currently established in the transmission 2, it is determined whether the operating point is shifted across the downshift line 4←5 upwardly. In the present disclosure, a downshifting operation to shift the gear stage to the target stage stepwise in sequence will be called the "stepwise downshifting", and a downshifting operation to shift the gear stage directly to the target stage set to at least two stages lower than the current gear stage will be called the "skip downshifting". In addition, a downshift line to shift the gear stage from the current gear stage to at least two stages lower than the current gear stage will be called the "skip shift line".

If the operating point of the vehicle Ve is not shifted across the downshift line in the shift map 11 so that the answer of step S10 is NO, the routine returns.

By contrast, if the accelerator opening is increased to shift the operating point of the vehicle Ve across the downshift line toward the lower stage region in the shift map 11 so that the answer of step S10 is YES, the routine progresses to step S11.

Figure 9:
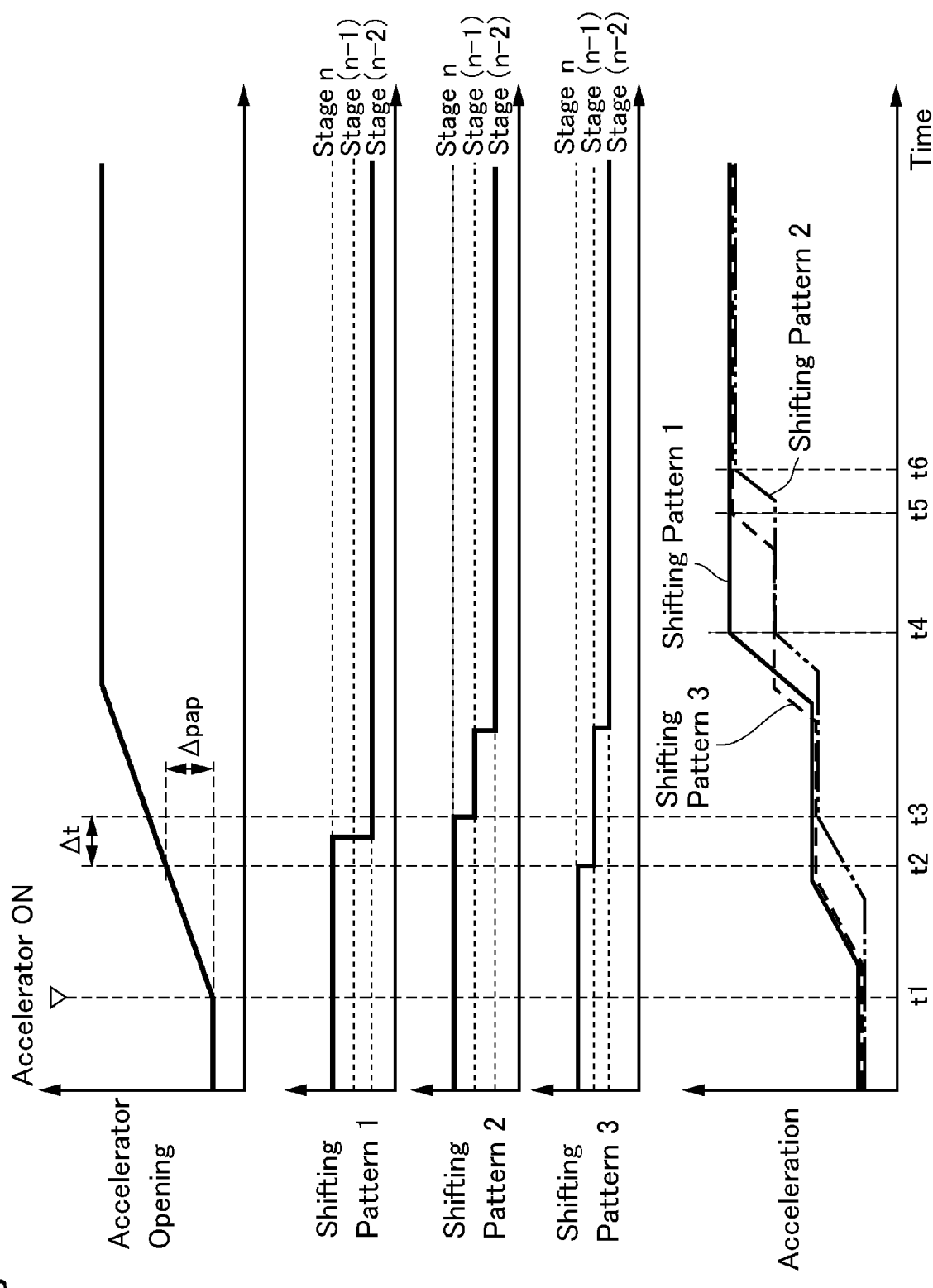
FIG. 9 is a time chart showing shifting patterns and a temporal change in the acceleration in each shifting pattern.

At step S11, an operating speed Vpap of the accelerator, that is, a depressing speed of the accelerator pedal 8 is calculated using the following formula:

$$Vpap = \Delta pap/(t2-t1)$$

where t1 is a time point at which the accelerator pedal 8 is depressed indicated as "Accelerator ON" in the after-mentioned time chart shown in FIG. 9, t2 is a time point at which the operating point reaches the downshift line so that the downshifting is commenced, and Δpap is a change in an operating amount of the accelerator (that is, a depression of the accelerator pedal 8) between point t1 and t2 as indicated in FIG. 9.

Then, the routine progresses to step S12 to calculate an evaluation score of an acceleration feel given that the current downshifting is executed by the skip downshifting, and an evaluation score of an acceleration feel given that the current downshifting is executed by the stepwise downshifting. Such evaluation score quantifies acceleration feel or acceleration response based on an evaluation index and a depressing speed of the accelerator pedal 8. According to the embodiment of the present disclosure, as shown in FIGS. 4 and 5, the evaluation index and the evaluation score at different depressing speeds of the accelerator pedal 8 may be calculated in advance.

The calculated evaluation score of the acceleration feel to be achieved by the skip downshifting and the calculated evaluation score of the acceleration feel to be achieved by the stepwise downshifting are compared to each other, and the downshifting operation is selected from the stepwise downshifting and the skip downshifting possible to achieve the higher evaluation score. For this purpose, as shown in FIGS. 4 and 5, the evaluation score of the skip downshifting and the evaluation score of the stepwise downshifting are calculated in advance as the evaluation index.

Thus, in order to select a suitable gear stage in line with an acceleration demand of the driver, the evaluation index or the evaluation score are calculated in advance based on a result of an experiment or a simulation. In order to calculate the evaluation index or the evaluation score taking account of a stimulation intensity and an unconscious period of acceleration, a driving tests are conducted in various conditions. The unconscious period of acceleration and the stimulation intensity represent a behavior of the vehicle Ve resulting from the downshifting caused by an accelerating operation, which is sensed by the driver. Specifically, the unconscious period is a period of time from a point at which a changing factor of the (longitudinal) acceleration occurs to a point at which the driver starts sensing a change in the acceleration, and the unconscious period includes a control delay and a response time governed by a model and a grade of the vehicle. For example, the unconscious period is obtained based on a result of a sensory test. On the other hand, the stimulation intensity is a physical quantity obtained based on a change amount of an acceleration immediately after the unconscious period and a derivative of acceleration with respect to time (i.e., a jerk). That is, the stimulation intensity is a product of a change amount of acceleration and a jerk.

Figures 5, 6:
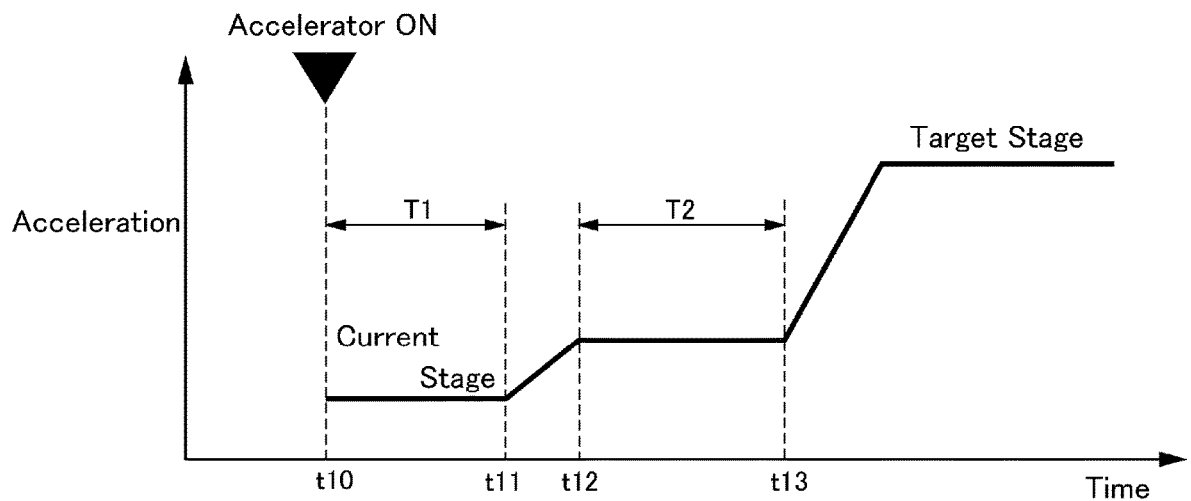
FIG. 5 is a table showing evaluation scores of acceleration feel to be achieved by operating the accelerator at a low speed.
FIG. 6 is a time chart showing unconscious periods T2 and T3 shown in FIGS. 4 and 5 during execution of the skip downshifting.

Specifically, FIG. 4 shows the evaluation scores of a case in which an operation speed of the accelerator is relatively high, and FIG. 5 shows the evaluation scores of a case in which an operation speed of the accelerator is relatively low. Optionally, the evaluation scores at different speed level may also be calculated in advance.

In FIGS. 4 and 5, T2 and T3 represent the unconscious period respectively. The unconscious period T2 during execution of the skip downshifting is indicated in FIG. 6. When the accelerator pedal 8 is depressed at point t10, an output torque of the engine 1 is increased thereby increasing acceleration of the vehicle Ve. Consequently, the driver starts sensing an increase in the acceleration at point tn. In this case, for example, the point t11 is determined by a result of a sensory test. During a first unconscious period T1 from the point t10 at which an accelerating operation is executed to the point t11, a drive force is not changed significantly and hence the driver cannot sense a change (i.e., an increase) in the acceleration. An inventor of the present application found that the first unconscious period T1 is extended with an increase in the vehicle speed.

After point t11, the acceleration is further increased to a predetermined value at point t12 in accordance with the current accelerator opening and the gear stage. In this situation, the drive force can be no longer increased in the current gear stage and hence the acceleration plateaus from point t12. At point t12, therefore, a downshift command is transmitted to shift the gear stage to the target stage at least two stages lower than the current gear stage. Consequently, the skip downshifting is commenced, but it takes some time until the acceleration is further increased. Therefore, a second unconscious period T2 starts from point t12, and the driver is allowed to sense an increase in the acceleration at point t13. The acceleration is further increased until the gear stage is shifted to the target stage. The second unconscious period T2 is also extended with an increase in the vehicle speed.

Figure 7:
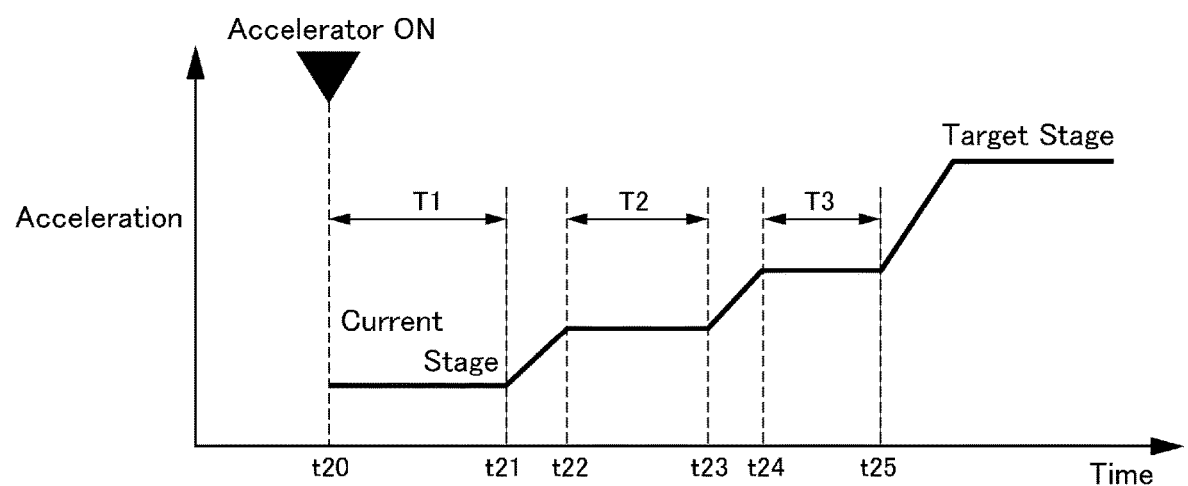
FIG. 7 is a time chart showing unconscious periods T2 and T3 shown in FIGS. 4 and 5 during execution of the stepwise downshifting.

Turning to FIG. 7, there are shown the unconscious periods T2 and T3 during execution of the stepwise downshifting. When the accelerator pedal 8 is depressed at point t20, an output torque of the engine 1 is increased thereby increasing acceleration of the vehicle Ve. Consequently, the driver starts sensing an increase in the acceleration at point t21. In this case, the point t21 is also determined by a result of a sensory test. During the first unconscious period T1 from the point t20 at which an accelerating operation is executed to the point t21, a drive force is not changed significantly and hence the driver cannot sense a change (i.e., an increase) in the acceleration. As described, the first unconscious period T1 is extended with an increase in the vehicle speed.

After point t21, the acceleration is further increased to a predetermined value at point t22 in accordance with the current accelerator opening and the gear stage. In this situation, the drive force can be no longer increased in the current gear stage and hence the acceleration plateaus from point t22. At point t22, therefore, a downshift command is transmitted to shift the gear stage to the target stage one stage lower than the current gear stage, that is, to an interim stage. Consequently, the first downshifting to the interim stage is commenced, but it takes some time until the acceleration is further increased. Therefore, the second unconscious period T2 starts from point t22, and the driver is allowed to sense an increase in the acceleration at point t23. As described, the second unconscious period T2 is also extended with an increase in the vehicle speed.

After point t23, the acceleration is further increased to a predetermined value at point t24 in accordance with the current accelerator opening and the gear stage (i.e., the interim stage). In this situation, the drive force can be no longer increased in the interim stage and hence the acceleration plateaus from point t24. At point t24, therefore, a downshift command is transmitted again to shift the gear stage from the interim stage to the target stage at least one stage lower than the interim stage. Consequently, the second downshifting to the target stage is commenced, but it takes some time until the acceleration is further increased. Therefore, the third unconscious period T3 starts from point t24, and the driver is allowed to sense an increase in the acceleration at point t25. The third unconscious period T3 is also extended with an increase in the vehicle speed.

The evaluation index and the evaluation score are calculated in each of the unconscious periods T2 and T3, in each of the cases of the skip shifting and the stepwise shifting. In other words, the evaluation index and the evaluation score are obtained in each of the unconscious periods T2 and T3 caused by accelerating operations in the sensory test of the skip downshifting, and in each of the unconscious periods T2 and T3 caused by accelerating operations in the sensory test of the stepwise downshifting. Specifically, the evaluation score becomes higher with a reduction in the unconscious period, in other words, the evaluation index becomes higher with a reduction in the unconscious period.

In FIGS. 4 and 5, "a", "b", "c", and "d" respectively represent a length of the unconscious period. Specifically, "a" is the longest period, and "d" is the shortest period. The specific values indicated in FIGS. 4 and 5 are merely one example of the evaluation index and the evaluation score, and the evaluation index and the evaluation score are not limited to those values.

The applicants of the present disclosure disclose this kind of shift control method of the automatic transmission based on the unconscious period and the stimulation intensity in JP-A-2017-48916. In JP-A-2017-48916, the stimulation intensity used to calculate the evaluation index and the evaluation score is explained in more detail. According to the embodiment of the present disclosure, the evaluation index and the evaluation score may also be calculated based on other conventional evaluation method or technique instead of the stimulation intensity.

Turning back to FIG. 3, it is determined at step S13 whether the evaluation score of the case of executing the skip downshifting is higher than the evaluation score of the case of executing the stepwise downshifting. That is, the evaluation score of the case of executing the skip downshifting and the evaluation score of the case of executing the stepwise downshifting are compared to each other to assess which of the evaluation score is higher than the other one.

Thus, the downshifting to be executed is selected from the skip downshifting and the stepwise downshifting based on the evaluation score (i.e., the evaluation index). To this end, first of all, the unconscious period T2 to be caused by executing the skip downshifting in the current operating condition, and the unconscious periods T2 and T3 to be caused by executing the stepwise downshifting in the current operating condition, are calculated respectively. As described, the downshifting operation is caused when the operating point in the shift map 11 determined based on the current vehicle speed and the current accelerator opening is shifted across the downshift line. As also described, the unconscious period may also be estimated based on a result of an experiment or a simulation. Then, the evaluation score corresponding to the calculated or estimated unconscious period T2 to be caused by executing the skip downshifting, and a total score of the evaluation scores corresponding to the calculated or estimated unconscious periods T2 and T3 to be caused by executing the stepwise downshifting are compared to each other. For example, in a case of using the tables shown in FIGS. 4 and 5 and an operating speed of the accelerator is relatively high, if the unconscious period T2 to be caused by executing the skip downshifting is "b", the evaluation score of the skip downshifting is 3.1. In this case, if the unconscious period T2 to be caused by executing the stepwise downshifting is "b", and the unconscious period T3 to be caused by executing the stepwise downshifting is "c", the evaluation score of the stepwise downshifting is "1.4+1=2.4". That is, in this case, the evaluation score of the skip downshifting is higher than the evaluation score of the stepwise downshifting.

If the evaluation score of the stepwise downshifting is higher than the evaluation score of the skip downshifting so that the answer of step S13 is NO, the routine progresses to step S14.

At step S14, a command signal to execute the stepwise downshifting is transmitted, and thereafter, the routine returns.

By contrast, if the evaluation score of the skip downshifting is higher than the evaluation score of the stepwise downshifting so that the answer of step S13 is YES, the routine progresses to step S15.

At step S15, a command signal to execute the skip downshifting is transmitted, and thereafter, the routine returns.

Figure 8:
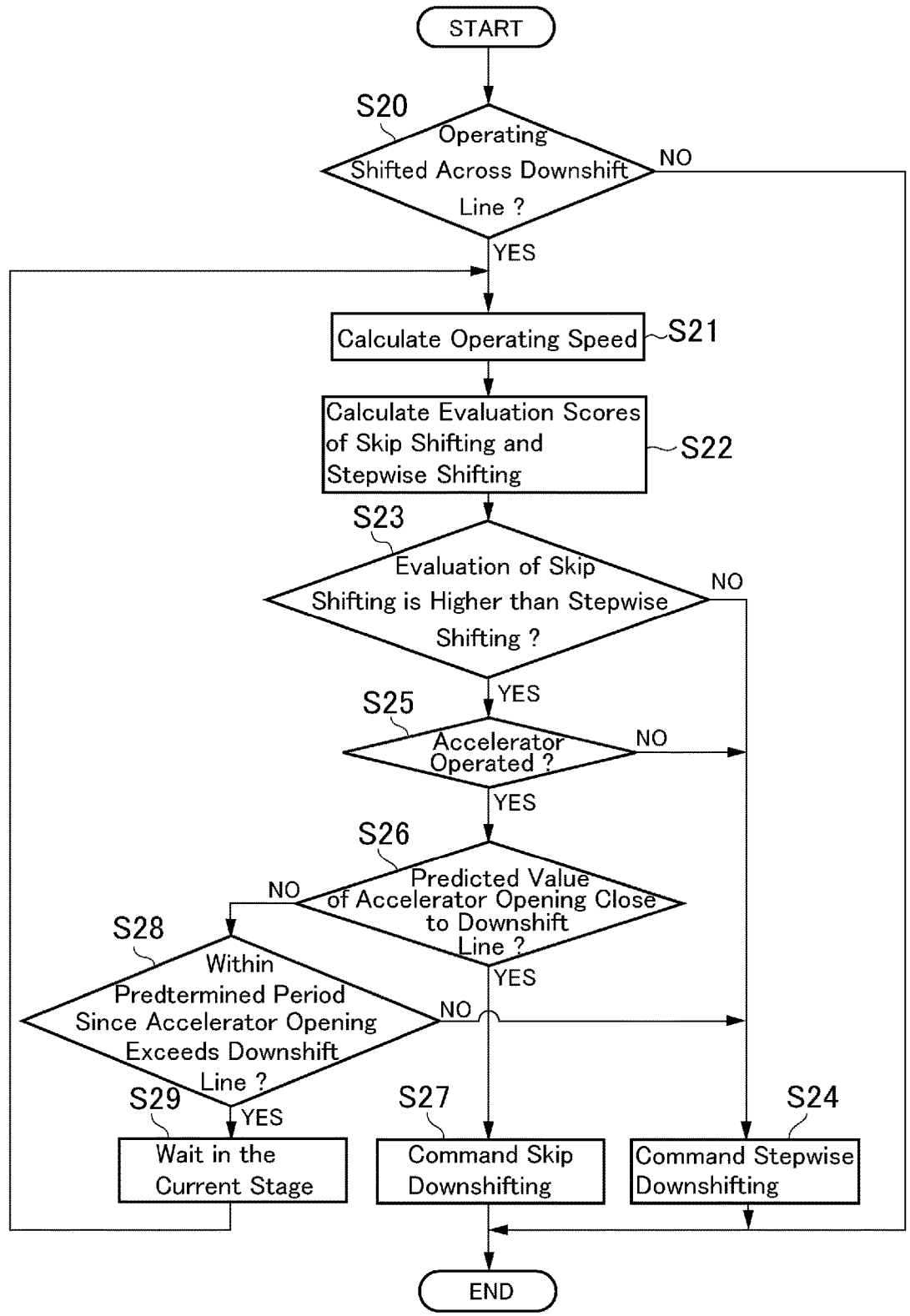
FIG. 8 is a flowchart showing another example of a routine executed by the vehicle control system according to the embodiment of the present disclosure.

Turing to FIG. 8, there is shown another example of the routine for selecting the downshifting operation from the skip downshifting and the stepwise downshifting.

In the routine shown in FIG. 8, contents of steps S20, S21, S22, S23, and S24 are similar to steps S10, S11, S12, S13, and S14 of the routine shown in FIG. 3, respectively. According to the routine shown in FIG. 8, if the evaluation score of the skip downshifting is higher than the evaluation score of the stepwise downshifting so that the answer of step S23 is YES, the routine progresses to step S25.

At step S25, it is determined whether the accelerating operation is still continued, in other words, it is determined whether the depression of the accelerator pedal 8 as the accelerator opening is still increasing. For example, of an operating amount of the accelerator is smaller than a predetermined value, the controller 10 determines that the accelerating operation is not continued. Instead, such discontinuation of the accelerating operation may also be determined if a change amount of the accelerator opening is smaller than a predetermined value. Specifically, the predetermined value of the operating amount of the accelerator or the change amount of the accelerator opening is set to approximately zero. That is, if the operating amount of the accelerator is smaller than the predetermined value, if the change amount of the accelerator opening is smaller than the predetermined value, this means that the accelerator opening increases only slightly and hence the answer of step S25 will be NO.

If the accelerating operation is not continued, in other words, if the accelerator opening is no longer increase or increases only slightly so that the answer of step S25 is NO, the routine progresses to step S24.

At step S24, the command signal to execute the stepwise downshifting is transmitted. In this case, since the accelerating operation is not continued or the accelerator opening is no longer increase significantly, the operating point will not be shifted in the shift map 11 to the skip shift line to execute the skip downshifting in short time. Therefore, the stepwise shifting is executed immediately, and thereafter the routine returns.

By contrast, if the accelerating operation is continued, in other words, if the accelerator opening is still increasing so that the answer of step S25 is YES, the routine progresses to step S26. In this case, it is expected that the operating point will be shifted in the shift map 11 to the skip shift line to execute the skip downshifting in short time.

At step S26, a predicted value of the accelerator opening at the termination of the current accelerating operation is estimated, and it is determined whether the predicted value of the accelerator opening is close to the skip shift line to execute the skip downshifting. Specifically, the predicted value of the accelerator opening is estimated based at least on an operating amount of the accelerator, a change amount of the operating amount of the accelerator, and a tendency of a change in the operating amount of the accelerator. For example, the predicted value of the accelerator opening may be estimated by obtaining an operating amount of the accelerator and an operating speed of the accelerator, while with reference to data about past accelerating operations and a travelling history. If the past data and the travelling history are insufficient, or if such estimation of the predicted value of the accelerator opening is omitted to simplify the control, a current operating amount of the accelerator or a current accelerator opening may also be employed as the predicted value of the accelerator opening.

The answer of step S26 will be YES if the predicted value of the accelerator opening in the shift map 11 falls within a predetermined range from the skip shift line defining e.g., the one stage lower region and the two stages lower region. By contrast, the answer of step S26 will be NO if the predicted value of the accelerator opening in the shift map 11 falls out of the predetermined range from the skip shift line defining e.g., the one stage lower region and the two stages lower region. In other words, the answer of step S26 will be NO if the predicted value of the accelerator opening in the shift map 11 has not yet been increased across the skip shift line defining e.g., the one stage lower region and the two stages lower region, and still remaining in the one stage lower region. Such predetermined range is set in the shift map 11 based on a result of experiment or simulation.

If the predicted value of the accelerator opening in the shift map 11 is close to the skip shift line so that the answer of step S26 is YES, the routine progresses to step S27 to transmit the command signal to execute the skip downshifting, and thereafter, the routine returns. In this case, the accelerator opening has not yet been increased across the skip shift line but close enough to the skip shift line. Therefore, it is expected that the operating point will be increased in the shift map 11 across the skip shift line to execute the skip downshifting in short time. For this reason, although the accelerator opening has not yet been increased across the skip shift line, the skip downshifting is executed in a proactive manner.

By contrast, if the predicted value of the accelerator opening in the shift map 11 is not close to the skip shift line, that is, if the predicted value of the accelerator opening has not yet been increased across the skip shift line and still remaining in the one stage lower region so that the answer of step S26 is NO, the routine progresses to step S28.

At step S28, it is determined whether an elapsed time from a point at which the accelerator opening has been increased across the downshift line defining the current region and the one stage lower region is within a predetermined period $\Delta t$. Specifically, at step S28, it is determined whether the predetermined period $\Delta t$ has elapsed from the point (t2) at which the accelerator opening was increased across the downshift line defining the current region and the one stage lower region but without exceeding the skip shift line. That is, the predetermined period $\Delta t$ is a waiting time until the condition to execute the skip downshifting is satisfied (or not satisfied). The predetermined period $\Delta t$ is set in such a manner that a possibility to execute the skip downshifting is not reduced more than necessary, and that a required time to execute the downshifting is not increased excessively, based on a result of an experiment or a simulation.

Such determination at step S28 is made in the case that the predicted value of the accelerator opening in the shift map 11 is not close to the skip shift line, and that the accelerating operation is still continued to increase the accelerator opening. That is, there is still a possibility that the accelerator opening is increased across the skip shift line. At step S28, therefore, the predetermined period $\Delta t$ is set, and wait in the current gear stage until elapse of the predetermined period $\Delta t$. If the condition to execute the skip downshifting is not satisfied within the predetermined period $\Delta t$, the stepwise downshifted is executed immediately without waiting a further increase in the accelerator opening.

Specifically, if the predetermined period $\Delta t$ has not elapsed from the point at which the accelerator opening was increased across the downshift line defining the current region and the one stage lower region but without exceeding the skip shift line so that the answer of step S28 is YES, the routine progresses to step S29.

At step S29, specifically, a command signal to wait in the current gear stage is transmitted, and thereafter returns to step S21 to repeat the subsequent steps. That is, the gear stage is maintained to the current stage during the predetermined period $\Delta t$ until any one of the stepwise downshifting and the skip downshifting is executed.

By contrast, if the predetermined period $\Delta t$ has elapsed from the point at which the accelerator opening was increased across the downshift line defining the current region and the one stage lower region but without exceeding the skip shift line so that the answer of step S28 is NO, the routine progresses to step S24.

At step S24, specifically, a command signal to execute the stepwise downshifting is transmitted, and thereafter, the routine returns.

Changes in the acceleration during execution of the routine shown in FIG. 8 in each shifting patterns is shown in FIG. 9. The driver starts depressing the accelerator pedal 8 at point t1, and a change $\Delta pap$ in an operating amount (that is a depression) of the accelerator pedal 8 from point t1 to point t2 is calculated. At the same time, an operating speed Vpap as a depressing speed of the accelerator pedal 8 is calculated. That is, the above-explained step S21 of the routine shown in FIG. 8 (or step S11 of the routine shown in FIG. 3) is executed. At point t2, in addition, an evaluation score of the skip downshifting and an evaluation score of the stepwise downshifting are compared to each other. As a result, if the stepwise downshifting is selected, the shifting pattern 3 is commenced at point t2 to shift the gear stage from the current stage (n) to the interim stage (n-1). In FIG. 9, a change in the acceleration in the case of executing the shifting pattern 3 is indicated by the dashed line. According to the shifting pattern 3, the increase in the acceleration is terminated at point t5. That is, the downshifting is started at point t1 and completed at point t5.

In a case that the skip downshifting is selected at point t2, the skip downshifting is not commenced immediately. In this case, the determination to select the downshifting to be executed from the skip downshifting and the stepwise downshifting is made from point t2 to point t3, that is, during the predetermined period $\Delta t$. Consequently, if the skip downshifting is selected, the shifting pattern 1 is commenced to shift the gear stage from the current stage (n) directly to the target stage (n-2). In FIG. 9, a change in the acceleration in the case of executing the shifting pattern 1 is indicated by the solid line. According to the shifting pattern 1, the increase in the acceleration is terminated at point t4. That is, the downshifting is started at point t1 and completed at point t4.

In a case that the skip downshifting is not selected during the predetermined period $\Delta t$ from point t2 to point t3, the shifting pattern 2 is commenced at point t3 after the lapse of the predetermined period $\Delta t$ to shift the gear stage from the interim stage (n) to the target stage (n-1). In FIG. 9, a change in the acceleration in the case of executing the shifting pattern 2 is indicated by the two-dotted dashed solid line. According to the shifting pattern 2, the increase in the acceleration is terminated at point t6. That is, the downshifting is started at point t1 and completed at point t6.

Thus, according to the embodiment of the present disclosure, the evaluation scores of acceleration feel to be achieved by the skip shifting and the stepwise shifting are compared to each other when executing the power-on downshifting so as to select the downshifting to be executed in such a manner as to achieve better acceleration feel or acceleration response. For this purpose, as shown in FIGS. 4 and 5, the evaluation indexes or the evaluation scores at different depressing speeds of the accelerator pedal are calculated in advance for each cases of executing the skip downshifting and executing the skip downshifting. According to the embodiment of the present disclosure, therefore, the power-on downshifting may be executed in a suitable manner to improve the acceleration response and the acceleration feel.

In the case that the skip downshifting is selected based on the evaluation index, an execution of the skip downshifting is determined based on a tendency of a change in an operating amount or operating speed of the accelerator, in other words, based on a preference or intension of the driver. For example, in the case that the skip downshifting is selected based in the evaluation index, if a change in the depression of the accelerator pedal is small or a depressing speed of the accelerator pedal is slow, the controller determines that the actual accelerator opening will not be increased to the skip shift line. In this case, therefore, the stepwise downshifting is executed immediately. By contrast, if a change in the depression of the accelerator pedal is large or a depressing speed of the accelerator pedal is high, the controller determines that the actual accelerator opening will be increased across the skip shift line. In this case, therefore, the skip downshifting is executed. That is, if it is expected that the operating point will be increased across the skip shift line in short time based on the estimated intension of the driver, the skip downshifting is executed in a proactive manner even if the accelerator opening has not yet been increased across the skip shift line. According to the embodiment of the present disclosure, therefore, the power-on downshifting may be executed in a suitable manner to improve the acceleration response and the acceleration feel.

What is claimed is:

1. A control system for a vehicle having a prime mover, drive wheels, and a transmission that can establish at least three gear stages to transmit torque between the prime mover and the drive wheels, comprising:
   a controller that controls a shifting operation of the transmission,
   wherein the controller is configured to:
      set a target stage of the shifting operation based on an accelerator opening and a vehicle speed increased by an accelerating operation of a driver,
      execute a downshifting from a current stage to the target stage that is set to a gear stage lower than the current stage, in response to the accelerating operation,
      compare an evaluation of a skip shifting to shift the gear stage directly to the target stage that is set to at least two stages lower than the current gear stage, to an evaluation of a stepwise shifting to shift the gear stage stepwise to the target stage, when executing the downshifting, based on an evaluation index calculated in advance in accordance with an operating condition of an accelerator, the evaluation index being calculated based on an unconscious period from a point at which a changing factor of an acceleration occurs to a point at which the driver starts sensing a change in the acceleration and stimulation intensity obtained based on a change amount of an acceleration immediately after the unconscious period and a derivative the acceleration with respect to time, and
      select the downshifting operation to be executed from the stepwise shifting and the skip shifting whose evaluation is higher than the other one.

2. The control system for the vehicle as claimed in claim 1, wherein the controller is further configured to:
   calculate an operating speed of the accelerator during a period from a point at which the accelerating operation has been started to a point at which a commencement of the downshifting is determined, and
   select the downshifting operation to be executed from the stepwise shifting and the skip shifting based on the evaluation index and the operating speed of the accelerator.

3. The control system for the vehicle as claimed in claim 1, wherein the controller is further configured to:
   execute the skip shifting if the accelerator opening is increased continuously by the accelerating operation, and
   execute the stepwise shifting if the accelerator opening is not increased continuously by the accelerating operation,
if the skip shifting is selected based on the evaluation index.

4. The control system for the vehicle as claimed in claim 1, wherein the controller is further configured to:
   calculate a predicted value of the accelerator opening at the termination of the accelerating operation, and
   determine whether to execute the skip shifting based on the predicted value of the accelerator opening,
if the skip shifting is selected, and the accelerator opening is increased continuously by the accelerating operation.

5. The control system for the vehicle as claimed in claim 4,
wherein the controller comprises a shift map determining regions for selecting the gear stage of the transmission, and
the controller is further configured to:
   execute the skip shifting if the predicted value of the accelerator opening in the shift map falls within a predetermined range from a skip shift line defining one stage lower region than a current region and two stages lower region than the current region, or
   execute the skip shifting if the predicted value of the accelerator opening in the shift map falls within the two stages lower region than the current region.

6. The control system for the vehicle as claimed in claim 5, wherein the controller is further configured to execute the stepwise shifting after the lapse of a predetermined period, if the predicted value of the accelerator opening in the shift map falls out of the predetermined range to the skip shift line.

7. The control system for the vehicle as claimed in claim 4, wherein the controller is further configured to calculate the predicted value of the accelerator opening based at least on an operating amount of the accelerator, a change amount of the operating amount of the accelerator, and a tendency of a change in the operating amount of the accelerator.

* * * * *